May 31, 1955  C. W. SMITH ET AL  2,709,471
SOLID TIRE AND METHOD OF MAKING SAME
Filed April 28, 1950                                      2 Sheets-Sheet 2
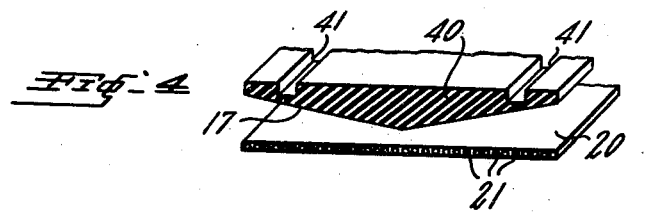
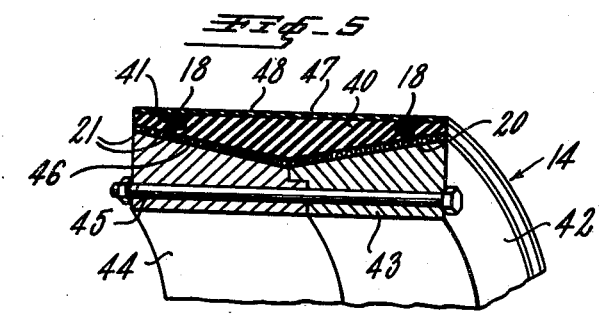
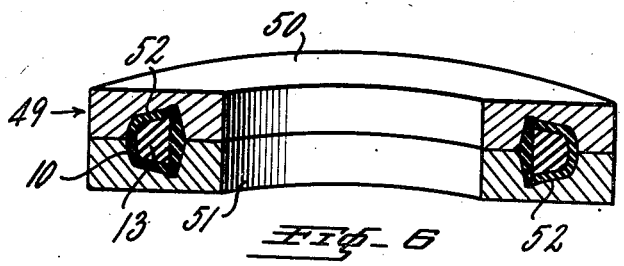
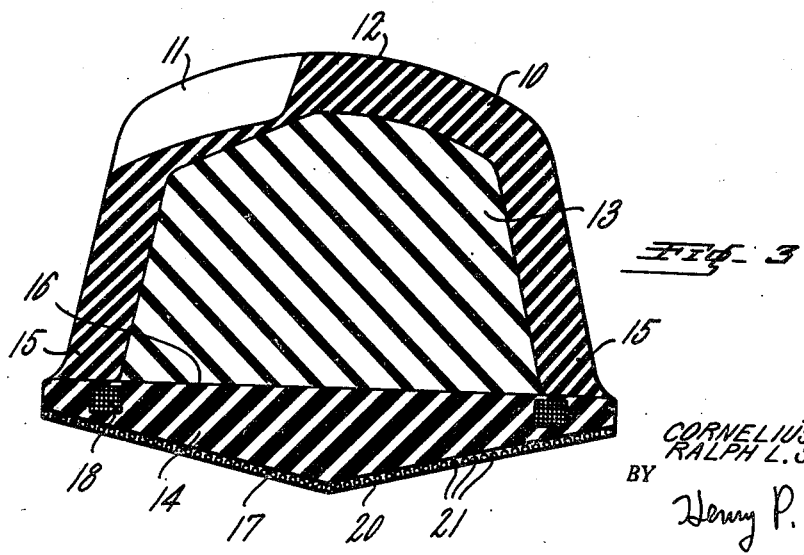
INVENTORS
CORNELIUS W. SMITH
RALPH L. SEGER, Jr.
BY
Henry P. Truesdell
ATTORNEY United States Patent Office 2,709,471
Patented May 31, 1955

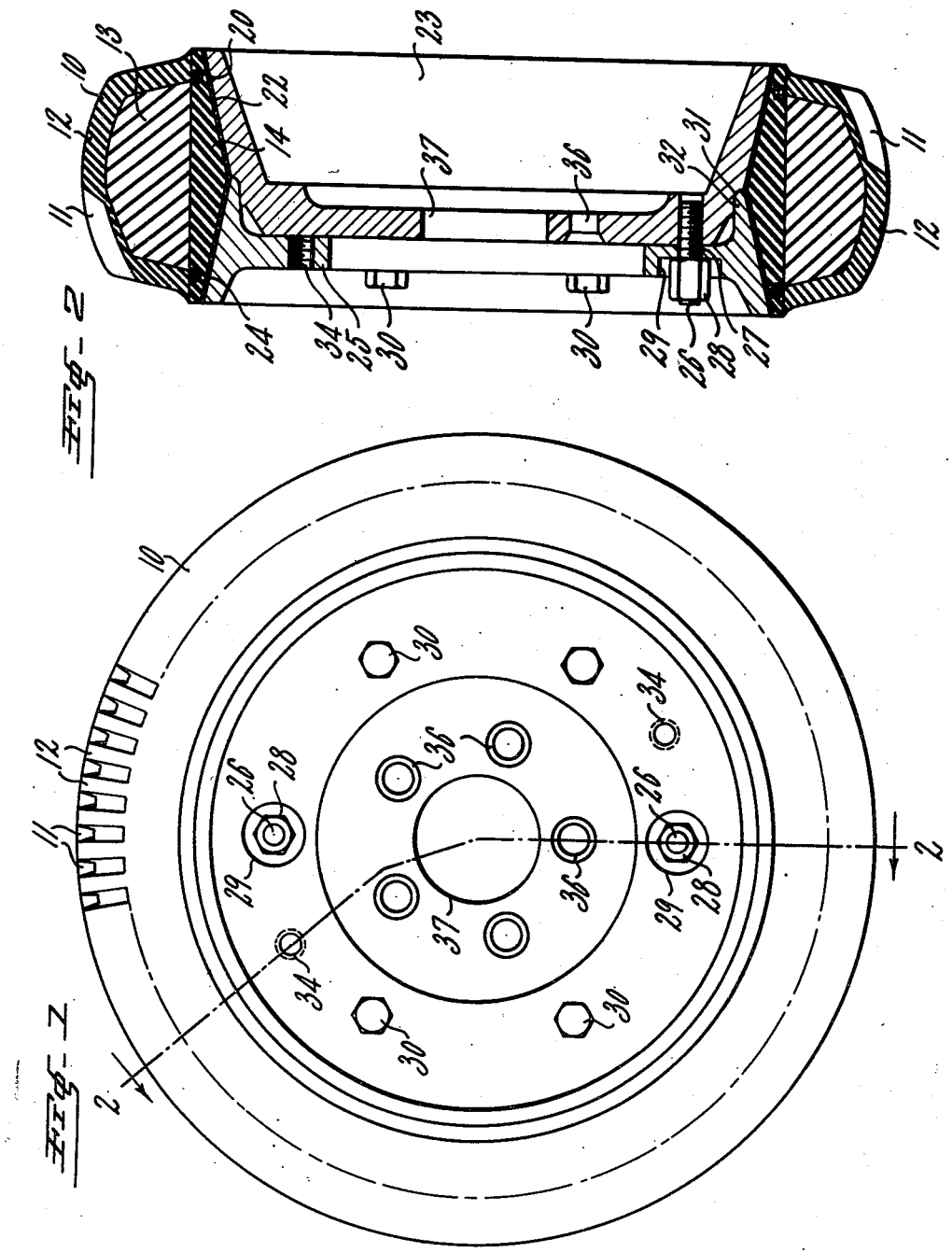

2,709,471

SOLID TIRE AND METHOD OF MAKING SAME

Cornelius W. Smith, Grosse Pointe, and Ralph L. Seger, Jr., Detroit, Mich., assignors to United States Rubber Company, New York, N. Y., a corporation of New Jersey Application April 28, 1950, Serial No. 158,624

5 Claims. (Cl. 152—310)

This invention relates to an improved solid tire and to a method of making same. More particularly, the invention relates to a solid tire which is easily mounted and dismounted, but which at the same time fits tightly on a wheel without slippage, both when the tire is new and throughout its service life.

Solid tires are highly desirable for use on factory trucks and for off-the-road service in general, for reasons of the economy and durability of such tires.

The common practice in the art has been to manufacture solid tires integrally united, as by vulcanizing, to an iron or steel rim, which was forced over the outer circumference of a wheel in tightly fitting frictional engagement therewith by application of great pressure in a press specially adapted for the purpose. Similarly, when the solid tire became worn and it was desired to replace it, the tire and integral rim had to be forced off the wheel with special jacking equipment. This inconvenient practice was engaged in because integrally uniting the solid tire to a rim in the manner described was the only satisfactory known method of providing a solid tire which would not slip on the wheel under the influence of the great stresses encountered when a heavily loaded vehicle running on such wheel was suddenly stopped or started, or when the wheel struck curbing or other obstacles.

Since the special equipment necessary for mounting and dismounting a solid tire integral with a wheel rim was not available in the usual shop or factory in which solid tired wheels were used, it was generally necessary to remove the entire wheel carrying a worn tire, and ship the same to a specially equipped shop where the old tire and rim were removed from the wheel and a new one put on. This involved inconvenience, expense, and delay, and meant that a supply of extra wheels had to be kept on hand if the vehicle was to remain in use while the tires were being changed.

Accordingly, a principal object of the present invention is to provide an improved solid tire which can be easily mounted and dismounted.

Another object is the provision of a solid tire which does not slip on the wheel under the influence of stresses encountered in service.

Still another object is to provide a method of manufacturing a solid tire in which the component structural parts of the tire are maintained in proper relation during the process of shaping and vulcanizing the tire.

Further objects and advantages will be made evident in the following detailed description of the invention when read with reference to the accompanying drawings, wherein:

Fig. 1 is a side elevation of a tire constructed according to the invention, mounted on a two-part separable wheel;

Fig. 2 is a transverse sectional view of the tire and wheel assembly taken along line 2—2 of Fig. 1;

Fig. 3 is a transverse sectional view of the tire on a larger scale;

Fig. 4 is an exploded fragmentary perspective view of certain of the component parts of the tire, illustrating a manner of assembly thereof;

Fig. 5 is a fragmentary perspective view of certain parts of the tire assembled on a form for partial vulcanization; and Fig. 6 is a cross-sectional perspective view of a mold containing the assembled tire in process of final vulcanization.

Referring to Figs. 1 and 2, the solid tire shown therein comprises a generally U-shaped outer shell or covering 10 of tough, durable, abrasion-resistant resilient material constituting the road-contacting surface and the greater portion of the sides of the tire. The road-contacting surface has an open anti-skid pattern therein defined by transverse grooves 11 and ridges 12. The cover 10 is preferably made of wear resistant natural rubber stock or synthetic rubber stock, and preferably has a Shore durometer hardness within the range of from 50 to 90, although reclaimed rubber, and various articificial or substitute rubbers or plastics of sufficient toughness and resilience may be used if desired.

Underlying the cover stock 10 there is a relatively softer, more resilient cushioning material 13, preferably composed of vulcanized rubber stock having a durometer hardness which is in the range of from 30 to 75, or other elastic material of similar properties. The cushioning stock 13 forms a core capable of absorbing shocks caused by irregularities in the floor or road.

The rim area of the tire is composed of a base strip 14 preferably made of semi-hard elastic material, usually vulcanized rubber stock of durometer hardness within the range of from 80 to 100, although the base strip may have a hardness corresponding to that of ebonite. The ends 15 (Fig. 3) of the shell 10 and the inner surface 16 of the cushion 13 are integrally united to the upper surface of the base strip 14 during vulcanization. The rim face 17 of the semi-hard strip 14 is tapered to a greater thickness at the center, such taper preferably being at an angle of from 8° to 17° measured from a transverse plane through the cross-section of the tire.

For the purpose of rendering the rim area of the finished tire inextensible so that the tire remains firmly seated on the wheel in spite of the blows and shocks encountered in service, there are embedded within the semi-hard base strip near the lateral edges thereof annular inextensible reinforcing elements, such as bundles of rubber covered wires 18.

In order to render the tire resistant to the stresses which tend to make the tire slip on the rim of the wheel on which it is mounted, the tapered rim surface 17 of the base strip 14 is faced with a covering layer 20 of relatively soft elastic material. The layer or strip 20 may be composed of vulcanized rubber stock, whether natural or synthetic, usually of durometer hardness within the range of from 30 to 70, and preferably about 40. If desired, the strip 20 may be made of other soft elastic plastic composition having physical properties similar to soft rubber. Such soft rubber or plastic stock is most effectively held firmly in place on the surface of the base strip by incorporating therein reinforcing filamentary material, such as textile cords 21, although other filaments, strands, fibers, wires, etc. may be used as reinforcement.

The tapered surface of the tire assembly seats on a correspondingly tapered rim flange 22 (Fig. 2) of the wheel body 23, and on a cooperating rim flange 24 of a demountable wheel ring 25 removably secured to the wheel body 23. The tapered outer faces of the flange 24 and ring 25 extend generally axially of the wheel at a slight angle thereto. The wheel body 23 is provided with a pair of elongated studs 26 which pass through corresponding holes 27 in the wheel ring 25. The wheel ring 25 is removably secured to the wheel body 23 by means of nuts 28 on the studs 26. The outer extremities of the stud holes 27 in the wheel ring 25 have countersunk portions 29. In this way, the ends of the studs 26 are accessible within the recesses 29 at the start of the operation of assembling the wheel parts, while such parts are still relatively far apart. This construction makes it unnecessary to use extra long studs which would objectionably project from the lateral extremities of the wheel and be subject to damage. Removable cap screws 30 threaded into suitable mating holes in the wheel body 23 and wheel ring 25 aid in maintaining the assembly together.

In assembly, the nuts 28, which are extra long, are first placed on the studs 26 projecting within the recesses 29, and the wheel parts 23 and 25 are drawn together. When the wheel parts are sufficiently close together, the cap screws 30 may be inserted to draw the parts together in final assembly. The use of extra long nuts 28 permits assembly to be accomplished with an ordinary wrench and also protects the extra length of thread on the studs 26 within the recesses 29, which would otherwise be exposed and subject to corrosion and damage.

When the wheel parts 23 and 25 are assembled, proper alignment is assured by mating of a circumferential recessed portion 31 (Fig. 2) of the wheel body 23 with a correspondingly shaped portion 32 on the inner surface of the wheel ring 25. The tapered wheel rim flanges 23 and 24 exert outward radial pressure on the correspondingly tapered rim face 14 of the tire as the wheel parts are brought together with the tire mounted thereon. This outward radial force is resisted by the inextensible reinforcing assemblies embedded in the semi-hard base strip 14 of the tire, with the result that the tire becomes firmly seated on the wheel rims.

For ease in dismounting the tire, two of the cap screws 30, after removal from the assembly, may be placed in threaded jack screw holes 34 passing through the wheel ring 25. When the cap screws 33 are threaded into the holes 34, they bear against the wheel body 23 and, upon tightening, the wheel members 23 and 25 are forced apart, freeing the tire. Thus, the tire is easily dismounted in a relatively short time using ordinary tools. Holes 36 are provided surrounding the hub 37 of the wheel 23 for mounting the assembly on a vehicle.

Considering now the preferred method of making the improved tire and referring to Fig. 4, the rim covering layer 20 of vulcanizable stock is applied, as by calendering in the usual manner, to each side of reinforcing textile cords 21, which may, if desired, be previously treated with a resin-latex solution to promote adhesion of the rubber to the textile filaments. As indicated previously, the stock comprising the layer 20 is vulcanizable to a relatively soft state, preferably a durometer hardness of about 40.

A strip 40 of vulcanizable stock is formed, suitably by extrusion, with tapered rim faces 17 and with longitudinal recesses 41 in its outer face for accommodating the inextensible reinforcing assemblies. The stock 40 is vulcanizable to a semi-hard state, preferably of durometer hardness within the range of from 80 to 100, as indicated previously in connection with the description of the base strip 14 of Fig. 3.

Strips 20 and 40 are cut in suitable lengths and the inextensible reinforcing assemblies, previously formed in annular shape, preferably by wrapping a number of turns of rubber covered wire 18 in circular form, are then disposed in the recesses 41 in the surface of the strip 40. The strips 20 and 40 are then applied as indicated in Fig. 5 to an annular form 42 comprising two separable mating rings 43 and 44 held together by stay bolts 45, and forming a tapered rim face 46 on which the tire base is assembled. The ends of the strips 20 and 40 are spliced together in a conventional manner on the form 42. Thereafter, a calendered or extruded strip 47 of stock, similar to the stock of the base strip 40, is applied to complete the base strip assembly 14, as indicated in Fig. 5.

The form 42 carrying the base strip assembly 14 is then placed in a suitable chamber and subjected to open steam to partially vulcanize the assembly. The degree of vulcanization imparted at this stage should be sufficient to fix the bead assemblies in place and to fix the general shape of the base strip assembly 14. With the usual rubber stocks, heating in open steam at 240° to 340° F. for from 2 to 100 minutes will impart the desired degree of cure. However, the degree of cure should be only partial, so that the base strip assembly 14 will not tend to become objectionably over-cured when the complete tire assembly is subjected to final shaping and molding and vulcanizing in a mold, as will be described below.

After the base assembly of the tire is partially cured, the outer surface 48 (Fig. 5) thereof is buffed and the vulcanizable strip of inner cushion stock 13, suitably formed by extrusion, is applied to the center of the surface 48 and spliced. If desired, the cushion 13 may also be formed by superimposing relatively thin calendered strips to form a laminate of the desired thickness. The outer shell 10, in the form of a calendered or extruded strip is disposed thereover to complete the tire assembly. The tire assembly is removed from the form 42, by removing the stay bolts 45, permitting separation of the rings 43 and 44. As indicated in Fig. 6, the assembly is then placed in a suitable split mold 49, comprising separable upper and lower mold halves 50 and 51 defining an annular cavity 52 in which the assembly is vulcanized under pressure by external heating in the usual manner. The desired anti-skid pattern is imparted to the surface of the tire in the mold 49. It will be understood that there is associated with the mold 49 the usual means for maintaining the mold tightly closed during the vulcanization process, as well as with means for heating the mold (not shown).

Because of the manner in which the base strip assembly 14 containing the inextensible reinforcing assemblies was previously partially vulcanized before the final molding step illustrated in Fig. 5, there is no tendency for the final molding operation to result in disruption of the reinforcing assemblies or in distortion or flow of the base strip into the area of the soft inner cushion strip 13. As a result, an exceptionally well assembled tire free from functional distortion is formed. At the same time, since the pre-cure of the base strip was only partial, this area does not become over-cured during final vulcanization to the detriment of its physical properties.

From the foregoing, it is seen that the invention provides a method of making an improved demountable solid tire. Because of the manner in which the rim area of the tire is reinforced with annular inextensible elements, completely encased in a rubber stock of at least moderate hardness, the tire is capable of withstanding circumferential stresses and other disruptive forces, and the tire remains firmly seated on the rim of the wheel on which it is mounted. Because the inextensible reinforcing elements are embedded in semi-hard stock there is no tendency for these elements to cut the material of the tire when subjected to strain.

The manner in which the rim face of the tire is tapered enables the tire to be gripped firmly by the separable wheel rims on which it is mounted, and at the same time this feature makes for ease in mounting and demounting the tire. The taper results in outward radial thrust on the tire during mounting causing it to become firmly seated.

The layer of soft stock on the rim face of the tire makes it possible for the tire to grip the wheel rim surface with exceptional firmness. It has ben observed in actual practice that heavily loaded trucks equipped with solid tires constructed in this manner could be started and stopped with great suddenness without producing any slippage of the tire on the wheel.

Because of the manner in which the soft stock on the rim face is reinforced with stranded material, such as textile cords or fabric, the stock is effectively maintained in place on the surface of the tire even though subjected to great pressure over prolonged periods of service.

The tire can be mounted and dismounted in a matter of minutes with ordinary tools, in contrast to conventional solid tires bonded to iron or steel rims which require a comparatively long time for mounting and demounting, as well as special equipment.

Having thus described our invention, what we claim and desire to protect by Letters Patent is:

1. A method of making a solid vulcanized rubber tire comprising the steps of forming a base strip of said tire with recesses to accommodate annular inextensible reinforcing elements, said strip being formed of rubber stock vulcanizable to a semi-hard condition, applying to the inner face of said strip a facing of rubber stock vulcanizable to a soft condition, applying said strip to an annular form, disposing said reinforcing elements in said recesses, partially vulcanizing said strip to fix the position of said reinforcing elements therein by heating the said strip on said form in open steam, applying a soft cushioning stock and an outer hard durable stock over said base strip to form a tire assembly, removing the said tire assembly from the said form, placing the said tire assembly in a mold, and completing the vulcanization of said tire assembly in said mold.

2. A solid tire for use on a wheel which is constructed and assembled so that the tire is subjected to outwardly directed radial compressive forces when mounted on the wheel flange comprising, in combination, an annular base strip of rubber stock having a durometer hardness of not less than 80, a facing of relatively soft, resilient rubber stock over the inner face of said base strip and having a durometer hardness less than that of said base strip, inextensible circumferentially extending annular reinforcing elements in said base strip adjacent the outer face thereof which resist the radial compressive forces exerted on the tire when it is mounted on the wheel and transmit said forces by means of said base strip to said relatively soft resilient facing to compress the same tightly against the wheel flange to prevent slippage of the tire on the wheel, and an annular cushion ring bonded to the outer face of said base strip.

3. A demountable solid tire for use on a split rim type wheel of the type having opposed tire engaging flanges which when forced together exert outward radial pressure on the tire comprising, an annular base strip of rubber stock having a durometer hardness of not less than 80, said base strip being formed with a greater thickness at the center, a facing of relatively soft resilient rubber stock over the inner face of said base strip, the rubber stock of said facing having a durometer hardness less than that of said base strip, inextensible circumferentially extending annular reinforcing elements in said base strip spaced from the inner face thereof which resist the outward radial pressure exerted by the opposed flanges of the wheel and transmit said pressure by means of said base strip to said relatively soft resilient facing to press the same tightly against the flanges of the wheel to prevent slippage of the tire on the wheel, a soft resilient cushioning core bonded to the outer face of said base strip and a tough, durable cover over said cushioning core.

4. A demountable solid tire for use on a split rim wheel of the type having opposed tapered tire engaging flanges which, when forced together, exert outward radial pressure comprising, in combination, an annular base strip of rubber stock having a durometer hardness of not less than 80, said base strip being tapered inwardly from opposite sides to a greater thickness at the center of its inner face, a facing of soft resilient rubber stock over the inner face of said base strip, said facing having a durometer hardness less than that of said base strip and being reinforced with cords, inextensible annular reinforcing members within said base strip located adjacent the outer sides thereof which function to resist the outward radial pressure exerted by the opposed tapered flanges of the wheel and distributes said pressure over the area of said soft resilient facing to press the facing tightly against the said tapered flanges of the wheel, and an annular cushion ring bonded to the outer face of said base strip.

5. A method of making a solid vulcanized rubber tire comprising the steps of forming a base strip of rubber stock vulcanizable to a semi-hard condition, applying to the inner face of said strip a facing of rubber stock vulcanizable to a soft condition, applying annular inextensible reinforcing elements circumferentially of said strip, applying said strip to an annular form, partially vulcanizing said strip to fix the shape of said strip and to fix the position of said reinforcing elements, applying a soft cushion stock over said base strip, placing the resulting assembly in a mold, and completing the vulcanization of said assembly.

References Cited in the file of this patent

UNITED STATES PATENTS

| Number | Name | Date |
|---|---|---|
| 474,423 | Straus | May 10, 1892 |
| 609,948 | Rodgers | Aug. 30, 1898 |
| 724,830 | Edmunds | Apr. 7, 1903 |
| 773,633 | Fiske | Nov. 1, 1904 |
| 1,026,468 | Selzer | May 14, 1912 |
| 1,162,158 | Haaker | Nov. 30, 1915 |
| 1,263,947 | Shomer et al. | Apr. 23, 1918 |
| 1,488,343 | Hoffman | Mar. 25, 1924 |
| 1,499,809 | Duke | July 1, 1924 |
| 1,544,639 | Fowler | July 7, 1925 |
| 1,548,843 | Korn | Aug 11, 1925 |
| 1,560,551 | Eger | Nov. 10, 1925 |
| 1,882,498 | Jarvis | Oct. 11, 1932 |
| 1,906,397 | Meyer | May 2, 1933 |
| 1,924,355 | Freedlander | Aug. 29, 1933 |
| 1,998,816 | Meyer | Apr. 23, 1935 |
| 1,998,817 | Meyer | Apr. 23, 1935 |
| 2,188,174 | Castricum et al. | Jan. 23, 1940 |
| 2,230,879 | Bronson | Feb. 4, 1941 |
| 2,292,980 | White | Aug. 11, 1942 |
| 2,337,985 | Freedlander | Dec. 28, 1943 |
| 2,422,266 | Steinke | June 17, 1947 |
| 2,525,196 | Bacon | Oct. 10, 1950 |